United States Patent [19]

Kawamura et al.

[11] Patent Number: 4,922,440
[45] Date of Patent: May 1, 1990

[54] TOOL PROFILE AUTOMATIC GRAPHIC DISPLAY SYSTEM

[75] Inventors: Hideaki Kawamura; Teruyuki Matsumura, both of Hachioji; Takashi Iwagaya, Hino, all of Japan

[73] Assignee: Fanuc Ltd, Minamitsuru, Japan

[21] Appl. No.: 26,446

[22] PCT Filed: Jun. 24, 1986

[86] PCT No.: PCT/JP86/00320
§ 371 Date: Feb. 9, 1987
§ 102(e) Date: Feb. 9, 1987

[87] PCT Pub. No.: WO87/00106
PCT Pub. Date: Jan. 15, 1987

[30] Foreign Application Priority Data
Jun. 27, 1985 [JP] Japan ................. 60-140793

[51] Int. Cl.$^5$ ............................................ G06F 15/00
[52] U.S. Cl. ................................. 364/474.22; 364/192
[58] Field of Search ........................... 364/188–192, 364/474, 475, 167–171, 474.22–474.27

[56] References Cited

U.S. PATENT DOCUMENTS

| 4,513,366 | 4/1985 | Munekata et al. | 364/167 |
| 4,513,381 | 4/1985 | Houser, Jr. et al. | 364/475 |
| 4,521,860 | 6/1985 | Kanematsu et al. | 364/191 |
| 4,530,046 | 7/1985 | Munekata et al. | 364/474 |
| 4,628,456 | 12/1986 | Shinohara et al. | 364/475 |
| 4,639,855 | 1/1987 | Sekikawa | 364/188 |

FOREIGN PATENT DOCUMENTS 175010 10/1983 Japan.
205209 11/1983 Japan.

Primary Examiner—Allen MacDonald
Attorney, Agent, or Firm—Staas & Halsey

[57] ABSTRACT

A tool profile automatic graphic display system according to the invention includes memory means (6) for storing a conversational-type machining program and a tooling file used as tool data, data input means (3) for inputting machining data, control means (1) for selecting an optimum tool in dependence upon specified machining data relating to a machining region and machined profile of a workpiece, and graphic display means (4) for graphically displaying the profile of a selected tool, the graphic display means (4) graphically displaying a tool profile along with a blank profile and machined profile automatically.

1 Claim, 4 Drawing Sheets

Fig. 3

TOOLING DATA REVISION    TOOL MANAGEMENT No. 002    07-02

TOOL TYPE    TP ;  GENERAL PURPOSE

| | | | NC SIDE |
|---|---|---|---|
| | | | HEAD 1 |
TOOL NOSE RADIUS RN: 0.5 | | | O 0000
CUTTING ANGLE AC: 5. | KP=01 CENTER BORING | | N 00000
TOOL NOSE ANGLE AN: 60. | =02 DRILLING | | 0.000
CUTTER PROTECTION ANGLE AP: 3. | =03 END FACE ROUGH CUTTING | | 0.000
IMAGINARY TOOL NOSE POSITION XN: 0.5 | =04 OUTER DIAMETER ROUGH CUTTING | | HEAD 2
ZN: 0.5 | =05 INNER DIAMETER ROUGH CUTTING | | O 0000
HOLDER RADIUS HD: 20. | =06 END FACE INTERMEDIATE FINISHING | | N 00000
TYPE OF PROCESS KP= □,□,□ | =07 OUTER DIAMETER INTERMEDIATE FINISHING | | 0.000
TOOL SELECTION NUMBER TN = 2 | =08 INNER DIAMETER INTERMEDIATE FINISHING | | 0.000
TOOL REVISION NUMBER TM = 2 | =09 END FACE FINISHING | |
MOUNTING ANGLE AS = 50. | =10 OUTER DIAMETER FINISHING | | T1 0000
MOUNTING POSITION XS = 0. | =11 INNER DIAMETER FINISHING | | T2 0000
ZS = 0. | =12 GROOVING | | M1 000
X MIRROR IMAGE XM = 0 | =13 CORNER REMOVAL | | M2 000
(ON=1, OFF=0) | =14 THREAD CUTTING | | S 00000

KP= _

RETRACT  ADVANCE  END
CURSOR   CURSOR

TOOL PROFILE AUTOMATIC GRAPHIC DISPLAY SYSTEM

BACKGROUND OF THE INVENTION

1. Technical Field

This invention relates to a tool profile automatic graphic display system for automatically describing the profile of a tool used when a workpiece is to be machined into a predetermined shape based on a conversational-type machining program using e.g. a computer-controlled NC lathe.

2. Description of the Related Art

In order to fabricate a workpiece having a complex, elaborate structure in cases where the machining is performed by a machine tool such as a cutter, drill or milling machine, positional coordinates are decided using e.g. a keyboard and display, and machining data (a program command tape) for numerical control (NC) are prepared. An NC unit numerically controls the machine tool on the basis of the machining data on the command tape to subject the workpiece to the desired machining.

In machining of this kind, the tools used naturally differ depending upon the type of machining, e.g. drilling and planar machining. Moreover, even for the same planar machining operation, cutting tools of various shapes are prepared and are used accordingly depending upon the shape to which the workpiece is to be cut and the region machined. To facilitate tool selection at such time, a CNC (computer NC) has been developed to enable the programming of NC data in accordance with drawings in a conversational mode of operation while the profile of a workpiece blank and the profile into which the workpiece blank is to be machined are displayed on a graphic display. With an NC unit of this kind, machining data are specified to create the machining program automatically. A list of tools prepared on the machine tool side is created in advance and the tools best suited for the workpiece material or region to be machined are then selected automatically. Since such cutting conditions as revised values of velocity and depth of cut which prevail when a selected tool is driven into operation change, the usual practice is to prepare files of plural cutting conditions, graphically display a tool trajectory in accordance with the file corresponding to the selected tool, and then decide the machining data.

When a machining drawing is complicated, however, the associated cutting requirements change frequently. Consequently, though the operator is capable of freely specifying the tools and regions to be machined, skill is required for such an operation. If it were attempted to decide all of the machining steps automatically by employing a function for such purpose, it would not be possible to check sufficiently for interference between the selected tool and a chuck or tool stock by relying solely upon the graphic display of the tool trajectory. The problem that would result is issuance of an alarm when the NC unit is operated by a machining tape or the like using the machining data that have been prepared.

SUMMARY OF THE INVENTION

An object of the present invention is to provide a tool profile automatic graphic display system capable of automatically portraying a tool profile along with a blank profile and machined profile when a tool is selected by utilizing a tooling file storing tool data, thereby making it possible to select the most suitable tools and readily create the appropriate NC machining tape.

The tool profile automatic graphic display system of the present invention includes memory means for storing a conversational-type machining program and a tooling file used as tool data, data input means for inputting machining data, control means for selecting an optimum tool in dependence upon specified machining data relating to a machining region and machined profile of a workpiece, and graphic display means for graphically displaying the profile of a selected tool, the graphic display means graphically displaying a tool profile along with a blank profile and machined profile automatically.

More specifically, in order to create NC command data in accordance with the present invention, a graphic display of the tool profile is performed by calling data for graphically displaying the profile of the selected tool from a memory in which the necessary data have been registered, and then specifying the required parameters.

BRIEF DESCRIPTION OF THE DRAWINGS

FIG. 3 is an explanatory view showing an example of a tooling file for deciding an optimum tool.

DESCRIPTION OF THE PREFERRED EMBODIMENT

Figure 2:
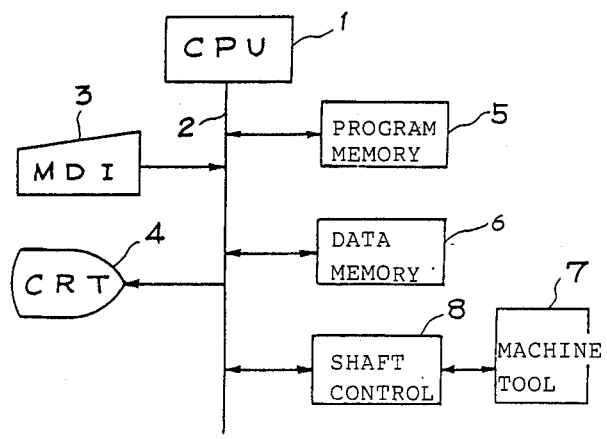
FIG. 2 is a block diagram showing an embodiment of the present invention.

An embodiment of the present invention will now be described in detail with reference to the drawings. As shown in FIG. 2, an NC unit which uses a microprocessor to process a machining program for selecting and controlling the drive of a prescribed tool such as a cutter includes a data input unit 3 such as manual data input unit (MDI), a display unit 4 such as a CRT, a program memory 5, a data memory 6 storing tool data and the like, and a controller 8 for controlling the drive shaft of a machine tool 7, all of which are connected to a bus 2 of the CPU 1.

FIG. 3 illustrates an example of a tooling file. When an operator machines a workpiece into a predetermined shape based on a conversational-type machining program using an NC unit of the above type, the tooling file makes it easy to decide the optimum tool by being displayed for the operator on the display unit 4.

The arrangement is such that such necessary data as tool type, tool nose radius, cutter angle, tool nose angle, tool nose protection angle, imaginary tool nose position, holder diameter, type of process, tool selection number, tool revision number, mounting angle, mounting position and X mirror image can be set in the tooling file.

Figure 1:
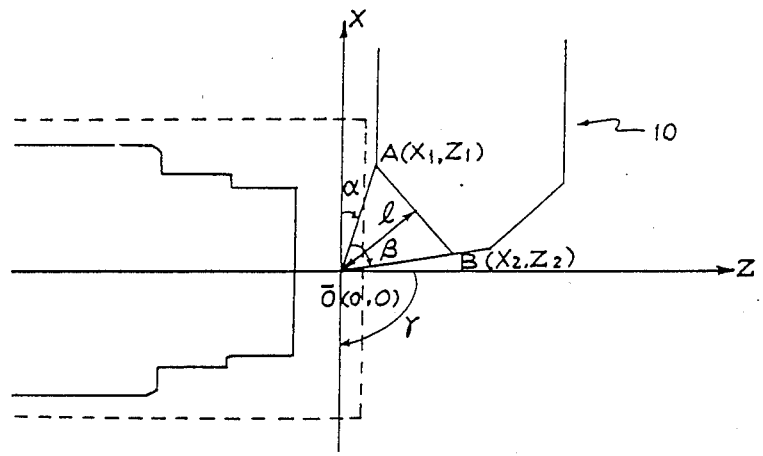
FIG. 1 is an explanatory view illustrating an example of a tool profile graphic display in accordance with the present invention.

FIG. 1 illustrates an example of a tool profile 10 displayed in an X-Z coordinate plane at the same time as a blank profile (dashed line) and machined profile (solid line).

A common procedure in automatic programming includes first selecting a coordinate system, then inputting the blank profile and its dimensions, inputting the machined profile and its dimensions, and thereafter selecting a tool. The tool profile 10 displayed as shown in FIG. 1 is an example of a cutting tool, wherein the cutting angle ($AC = \alpha$), tool nose angle ($AN = \beta$) and mounting angle ($AS = \gamma$) are defined as illustrated. When a parameter l, representative of cutting surface length, is specified with the position of the tool nose aligned with the origin of the coordinate system, points A $(X_1, Z_1)$, B $(X_2, Y_2)$ can be calculated using the following equations:

$$X_1 = -m \sin(\gamma - \alpha)$$

$$Z_1 = -m \cos(\gamma - \alpha)$$

$$X_2 = -m \sin(\gamma - \alpha - \beta)$$

$$Z_2 = -m \cos(\gamma - \alpha - \beta)$$

where $m = l/|\cos(\beta/2)|$

Accordingly, by inputting a tool number or revision number and specifying the parameter l, cutting angle, tool nose angle and the like on the display screen, the tool profile is displayed automatically. This makes it possible for the operator to readily find any designated tool interference, the uncut portion of the workpiece and the like.

FIGS. 4(a) through 4(d) illustrate examples of coordinate system settings for graphically displaying the profiles of a button tool, grooving tool, corner removing tool and drilling tool, respectively.

Figure 4:
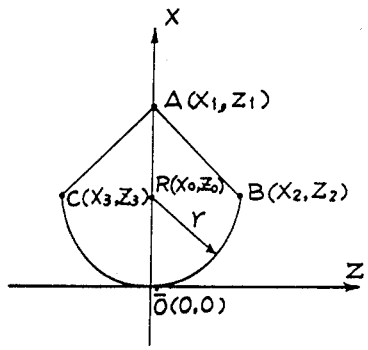
FIGS. 4(a) through 4(d) are explanatory views showing examples of setting coordinates for graphic display of a tool profile.
Figure 4:
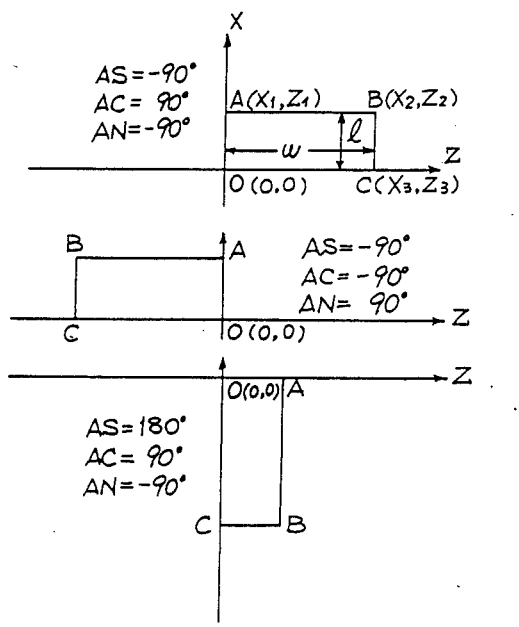
Figure 4:
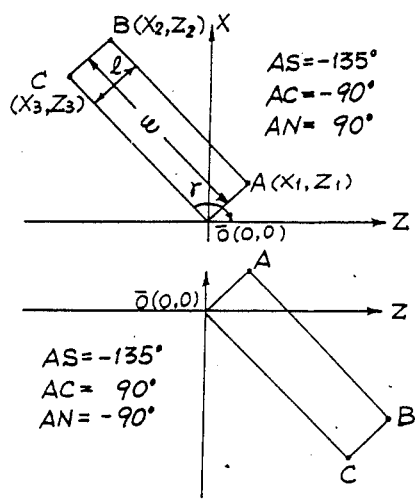
Figure 4:
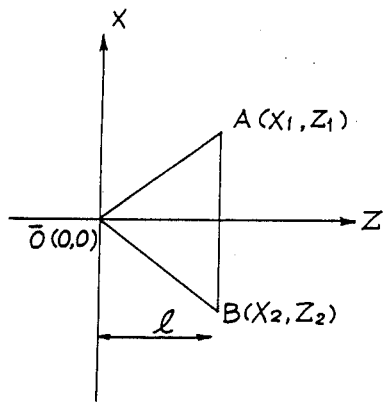

In the case in the button tool of FIG. 4(a), the tool profile to be displayed is described on the screen by defining the cutting angle ($AC = \alpha$), tool nose angle ($AN = \beta$), mounting angle ($AS = \gamma$) and tool nose radius ($Rn = r$). The points R $(X_0, Z_0)$, A$(X_1, Z_1)$, B$(X_2, Z_2)$, C$(X_3, Z_3)$ when the position of the tool nose is aligned with the origin are calculated by using the following equations:

$$X_0 = -r \sin \gamma$$

$$Z_0 = -r \cos \gamma$$

$$X_1 = 2X_0$$

$$Z_1 = 2Z_0$$

$$X_2 = -r(\sin \gamma - \cos \gamma)$$

$$Z_2 = -r(\cos \gamma + \sin \gamma)$$

$$X_3 = -r(\sin \gamma + \cos \gamma)$$

$$Z_3 = -r(\cos \gamma - \sin \gamma)$$

For the grooving tool and corner removing tool of FIGS. 4(b) and 4(c), the tool profiles to be displayed are described on the screen by defining the cutting angle ($AC = \alpha$), tool nose angle ($AN = \beta$), mounting angle ($AS = \gamma$), groove width ($Wn = w$) and parameter l. The points A $(X_1, Z_1)$, B$(X_2, Z_2)$, C$(X_3, Z_3)$ when the position of the tool nose is aligned with the origin are calculated by using the following equations:

$$X_1 = -l \sin(\gamma - \alpha - \beta)$$

$$Z_1 = -l \cos(\gamma - \alpha - \beta)$$

$$X_2 = X_1 + X_3$$

$$Z_2 = Z_1 + Z_3$$

$$X_3 = -w \sin(\gamma - \alpha)$$

$$Z_3 = -w \cos(\gamma - \alpha)$$

For the drilling tool of FIG. 4(d), the tool profile to be displayed is described on the screen by defining the drill radius ($DD = \alpha$), tool nose angle ($AN = \beta$), mounting angle ($AS = \gamma$) and the parameter l. The points A $(X_1, Z_1)$, B$(X_2, Z_2)$ when the position of the tool nose is aligned with the origin are calculated by using the following equations:

$$X_1 = -m \sin(\gamma + \beta/2)$$

$$Z_1 = -m \cos(\gamma + \beta/2)$$

$$X_2 = -m \sin(\gamma - \beta/2)$$

$$Z_2 = -m \cos(\gamma - \beta/2)$$

where $m = l/|\cos(\beta/2)|$

Thus, tool selection is carried out with ease by incorporating a program which, when a conversational-type machining program is executed, selects an optimum tool from the abovementioned tooling file and displays the tool profile together with the workpiece, as shown in FIG. 1, by means of the display unit 4.

In accordance with the automatic graphic display system of the present invention, a tool profile can be displayed automatically along with the blank profile and machined profile at the time of tool selection utilizing a tooling file storing tool data. This makes it possible to select the optimum tool and readily prepare a suitable NC machining tape.

What is claimed is:

1. A tool profile automatic graphic display system for automatically displaying a profile of a tool used when a workpiece is to be machined into a predetermined shape based on a conversational-type machining program, said system comprising:

memory means for storing a conversational-type machining program and a tooling file containing tool data, including a mounting angle and a tool nose angle for all tools, a cutting angle and a tool nose radius for button tools, the cutting angle, a groove width and a cutting surface length for grooving and corner removing tools and a drill radius and the cutting surface length for drilling tools, all relating to profiles of respective tools;

data input means for inputting machining data, including a machined profile of the workpiece, and tool identification data;

control means for selecting an optimum tool in dependence upon the tool data in the tooling file together with specific machining data relating to a machining region of the machined profile of the workpiece;

calculating means for calculating tool profile graphic display data in dependence upon the tool data relating to the profile and the mounting angle of the tool contained in the tooling file stored in said memory means; and graphic display means for graphically displaying the machined profile of the workpiece simultaneously with the profile of the optimum tool in dependence upon the tool data in the tooling file.

* * * * *